United States Patent [19]

Bohm et al.

[11] Patent Number: 5,599,868
[45] Date of Patent: Feb. 4, 1997

[54] PROCESS FOR COMPOUNDING FILLER MATERIALS AND POLYMERS AND PRODUCTS THEREFROM

[75] Inventors: Georg G. A. Bohm, Akron; William M. Cole, Clinton, both of Ohio

[73] Assignee: Bridgestone Corporation, Tokyo, Japan

[21] Appl. No.: 229,890

[22] Filed: Apr. 19, 1994

[51] Int. Cl.[6] .................................................... C08K 3/00
[52] U.S. Cl. .......................... 524/495; 524/496; 524/571; 523/213; 523/333
[58] Field of Search ................... 524/495, 571, 524/496; 523/333, 213

[56] References Cited

U.S. PATENT DOCUMENTS

| | | | |
|---|---|---|---|
| 2,538,809 | 1/1951 | Grotenhuis | 18/55 |
| 2,854,426 | 9/1958 | Dasher | 260/41.5 |
| 3,257,351 | 6/1966 | Kraus et al. | 260/41 |
| 3,294,720 | 12/1966 | Beber et al. | 260/23.7 |
| 3,380,958 | 4/1968 | Rees | 260/41.5 |
| 4,098,715 | 7/1978 | Masuko et al. | 252/182 |
| 4,157,320 | 6/1979 | Yankner et al. | 260/28.5 A |
| 4,321,168 | 3/1982 | Ueda et al. | 524/526 |
| 4,366,271 | 12/1982 | Riegler | 523/333 |
| 4,369,267 | 1/1983 | Keung et al. | 523/351 |
| 4,395,501 | 7/1983 | Briggs et al. | 523/351 |
| 4,417,005 | 11/1983 | Tokieda et al. | 523/351 |
| 4,696,970 | 9/1987 | Sumimura et al. | 524/860 |
| 4,788,229 | 11/1988 | Bohm et al. | 523/215 |
| 4,876,297 | 10/1989 | Peter | 523/351 |
| 5,162,409 | 11/1992 | Mroczkowski | 524/493 |

FOREIGN PATENT DOCUMENTS

| | | |
|---|---|---|
| 0184276 | 6/1986 | European Pat. Off. . |
| 266577A1 | 4/1989 | Germany . |
| 62-273267 | 11/1987 | Japan ............... C09C 1/48 |

*Primary Examiner*—Edward J. Cain
*Attorney, Agent, or Firm*—Daniel N. Hall

[57] ABSTRACT

A process for compounding filler materials and polymers for the preparation of vulcanizable rubber compositions comprises the steps of combining at least one polymer and other compounding ingredients with a filler treated with a liquid in an amount of from about 10 to 60 percent by weight, based upon the combined weight of the liquid and the filler under conditions sufficient to uniformly distribute the filler to form a pre-blend; and mixing the pre-blend until the filler is suitably dispersed throughout the polymer. A vulcanizable rubber composition containing a filler prepared by combining at least one polymer and other compounding ingredients with a filler treated with a liquid in an amount of from about 10 to 60 percent by weight, based upon the combined weight of the liquid and the filler under conditions sufficient to uniformly distribute the filler to form a pre-blend; and mixing the pre-blend until the filler is suitably dispersed throughout the polymer.

21 Claims, 2 Drawing Sheets

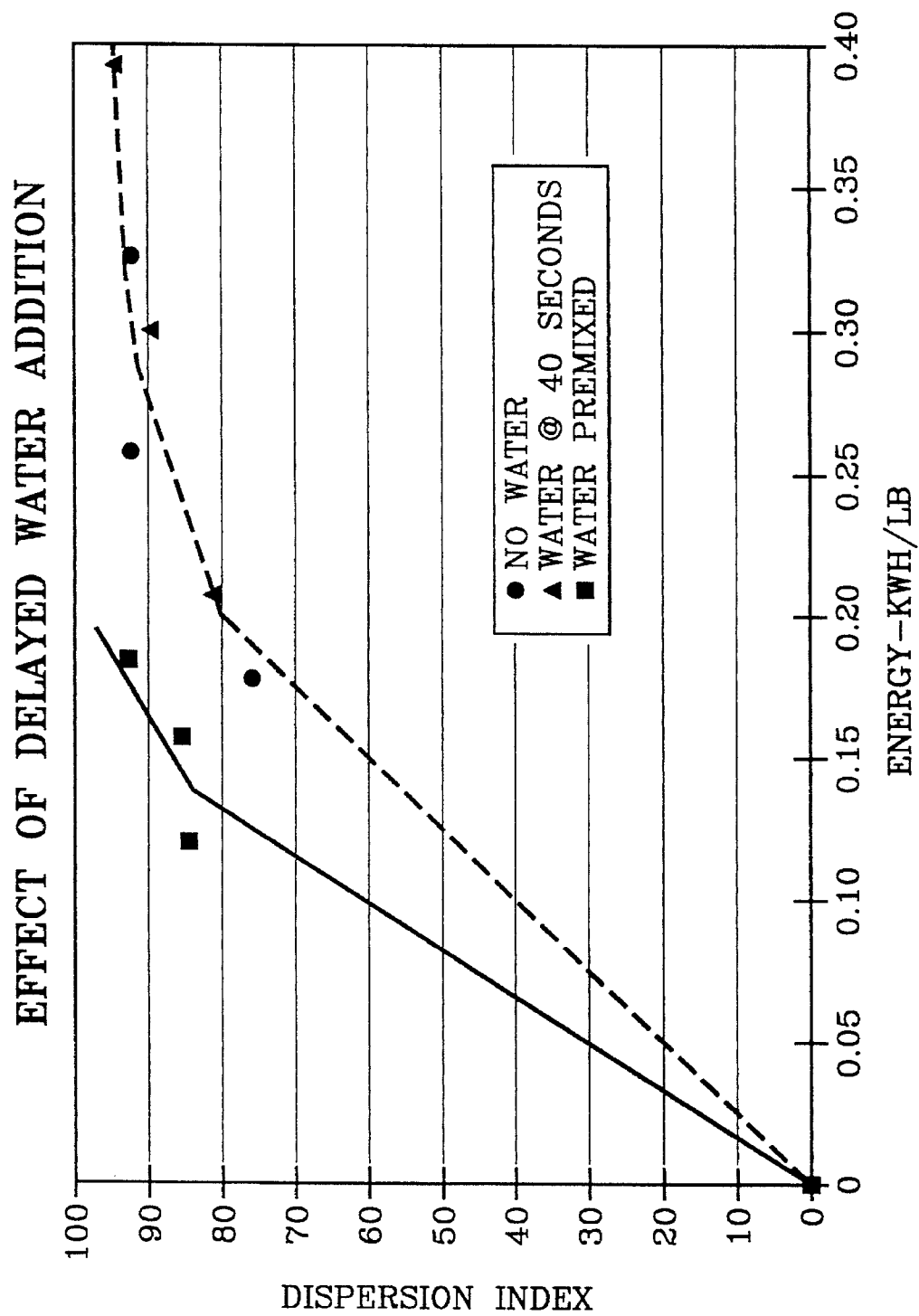

PROCESS FOR COMPOUNDING FILLER MATERIALS AND POLYMERS AND PRODUCTS THEREFROM

TECHNICAL FIELD

This invention relates to filled rubber compositions having improved filler dispersion within the rubber component. The invention also relates to a process for preparing a rubber composition. More particularly, the present invention is directed toward a process for compounding filler materials and polymers in a manner that is less energy intensive than existing techniques of rubber compounding.

BACKGROUND OF THE INVENTION

It is known in the art to compound polymers, such as rubbers, in order to provide the rubber composition with improved properties. Fillers, reinforcing agents, anti-oxidant, curing agents and the like are often added during the compounding operations. The compound is then processed into the shape of the desired product and is vulcanized such as by heating.

It is generally known that as the mix quality or dispersion of the filler materials, such as carbon black is improved, the uniformly and hence, desirability of the end product is correspondingly improved. That is, the more uniformly the materials are dispersed, the easier it is to provide a uniform end product.

Heretofore, it has been common in the art to add rubber and pelletized carbon black together and thoroughly mix to dispense the filler throughout the rubber. Another approach has been to combine rubber particles with the filler materials, both of which must normally be reduced in size to nanometer levels. In the latter instance, it has been found that conventional mixing leads to a morphology in which the rubber particles are surrounded and coated with carbon black and other stock components. It has also been found that batches of such morphology do not lend themselves to shear mixing. The rubber particles are lubricated by the carbon black and are caused to rotate by any shear forces which may be applied, such as by mixer blades or the like. Appreciable deformation does not occur until gradually, the rubber particles, the carbon black and other stock components are caused to compact. This happens when the interfaces between the rubber particles begin to decrease in size, which may be encouraged by high temperature and pressure. Thus, much energy is often spent on achieving compaction which is a prerequisite in the prior art for the commencement of an efficient mixing process.

Various means have been employed heretofore to incorporate carbon black into elastomers and other polymers which include mechanical mixing of the polymers and carbon black in different stages in both dry and liquid phases.

U.S. Pat. No. 2,538,809 for instance, is directed toward a process for compounding rubbery polymers which employs a slurry of carbon black and water. The slurry is subsequently added to an aqueous rubber dispersion in relative proportions to provide about 10 to 60 parts by weight of carbon black per 100 parts of rubber.

U.S. Pat. No. 2,854,426 is directed toward a process for treating an aqueous coagulum of a synthetic latex. In practice, the coagulum is mechanically mixed in a closed chamber to express the water and the partially dewatered batch is subjected to continued intense shearing action until it has been transformed into a plastic sheetable mass.

U.S. Pat. No. 3,257,351, discloses a method for producing a substantially agglomerate-free dispersion of pigments such as carbon black in ethylene polymers. The process includes forming a polyethylene-carbon black masterbatch and mixing the masterbatch with a further amount of polyethylene.

U.S. Pat. No. 3,294,720 is directed toward a process for making high quality vulcanizable tire tread compositions which includes the step of mixing fine reinforcing carbon black with wet crumb rubber having a moisture content of about 5 to 15 percent.

U.S. Pat. No. 5,380,958 discloses a method of incorporating carbon black into elastomers wherein a premixed aqueous carbon black and latex liquid is subjected to pressurization and the pressurized fluid material is subsequently forced through a restricted orifice.

U.S. Pat. No. 4,876,297 discloses a method for preparing a mixture of elastomeric material and carbon black by adding a portion of the carbon black to the elastomeric material, preheating the same in a high-frequency alternating field and then adding the remainder of the carbon black.

U.S. Pat. No. 4,788,229 is directed toward a process for preparing chemically modified uncured rubber compositions of at least one elastomer and at least one filler. The steps include the preparation of first and second mixtures of elastomer, reinforcing filler and a chemical agent capable of promoting linkages between the filler and elastomer and then blending the two mixtures together.

U.S. Pat. No. 4,417,005 discloses a method for preparing a rubber composition for tire treads. The rubber comprises an oil extended styrene-butadiene copolymer and at least one other diene rubber. The method is practiced by incorporating part or all of at least one of the rubber components with the carbon black, and mechanically mixing together followed by the addition of the balance of the rubber components.

U.S. Pat. No. 4,395,501 provides a process for producing a vulcanizate having improved properties. Two or more $C_4$ or $C_5$ conjugated diolefin containing polymers are mixed together with carbon black and other compounding ingredients except cure active agents. More particularly, a portion of one or more of the polymers is mixed with a portion of all of the carbon black and other compounding ingredients, followed by the addition of the remaining polymers, carbon black, if any, and compounding ingredients. The resulting mass is allowed to rest and is then compounded with the cure active agents, it is shaped and finally vulcanized.

U.S. Pat. No. 4,321,168 discloses a similar process for preparing tire tread compositions which comprise a substantially amorphous polybutadiene and natural rubber and/or 1,4-polyisoprene and carbon black. The process includes the steps of mechanically compounding a portion of the rubber with a portion of all of the carbon black and then adding the remainder of the rubber and carbon black, if any, and mechanically compounding the mass.

U.S. Pat. No. 4,098,715 is directed toward a process for blending liquid rubber and carbon black. The carbon black is initially dispersed in a liquid rubber by mixing 60 to 150 parts by weight of carbon black with 100 parts by weight of liquid rubber and then diluting the resulting dispersion with more liquid rubber to yield a final proportion of less than 50 parts of carbon black per 100 parts of liquid rubber.

BRIEF DESCRIPTION OF THE DRAWINGS

FIG. 2 is another graph plotting dispersion index versus energy required to disperse carbon black in rubber and the effect thereon attributable to the time of water addition.

SUMMARY OF INVENTION

Figure 1:
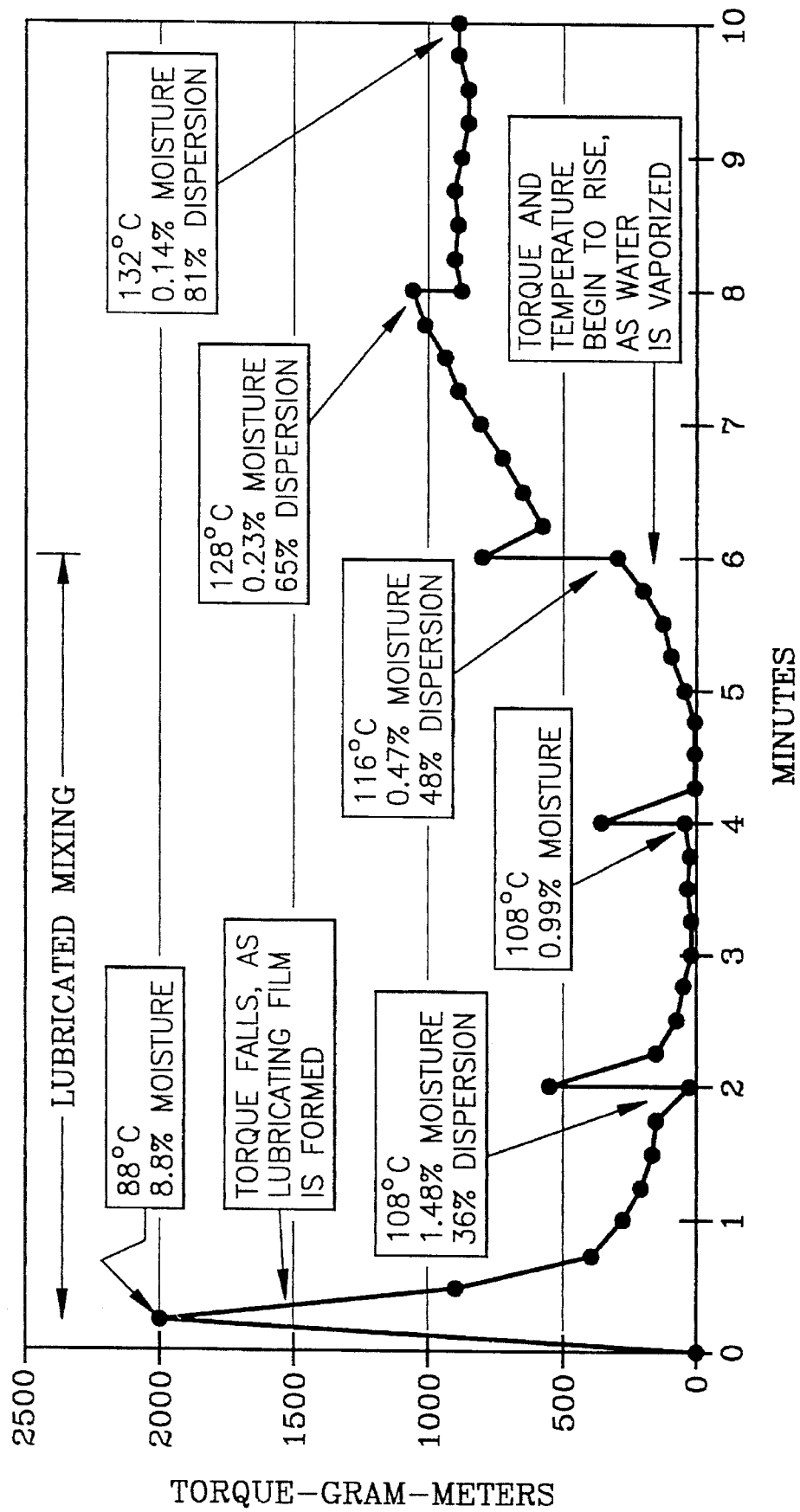
FIG. 1 is a graph plotting torque versus time relative to the dispersion of carbon black in rubber.

It is therefore an object of the present invention to provide a process of compounding rubber that improves the mix quality of rubber stocks.

It is another object of the present invention to provide a process that reduces the energy required to achieve a certain dispersion of filler material in rubber stocks.

It is yet another object of the present invention to provide a process for compounding rubber which allows mixing of all ingredients in a single process step without interruptions.

At least one or more of the foregoing objects together with the advantages thereof over known methods which shall become apparent from the specification which follows, are accomplished by the invention as hereinafter described and claimed.

In general, the present invention provides a process for compounding filler materials and polymers for the preparation of vulcanizable rubber compositions. The process comprises the steps of combining at least one polymer and other compounding ingredients with at least one filler treated with a liquid in an amount of from about 10 to 60 percent by weight, based upon the combined weight of the liquid and the filler under conditions sufficient to uniformly distribute the filler to form a pre-blend; and mixing the pre-blend until the filler is suitably dispersed throughout the polymer.

There is also provided according to the invention, a vulcanizable rubber composition containing a filler prepared by combining at least one polymer and other compounding ingredients with at least one filler treated with a liquid in an amount of from about 10 to 60 percent by weight, based upon the combined weight of the liquid and the filler under conditions sufficient to uniformly distribute the filler to form a pre-blend; and mixing the pre-blend until the filler is suitably dispersed throughout the polymer.

PREFERRED EMBODIMENT FOR CARRYING OUT THE INVENTION

The present invention is directed toward an improved process for compounding filler materials with polymers, and to improved products resulting therefrom. The invention has application to the mixing of polymers used for the preparation of vulcanizable rubber compositions. The polymers used herein contain carbon-carbon unsaturation in their molecular structure and include natural as well as synthetic rubbers. In this application and in the claims, the terms polymer, elastomer and rubber are used interchangeably. The polymers used in the present invention include natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the unvulcanized compositions of this invention have unsaturated carbon chains. That is, their polymer backbones contain a significant amount of unsaturation, in contrast to the pendant or vinyl saturation found in some other types of rubbers. Typically, the chains of such unsaturated rubbers have at least about 5 percent of their carbon-co-carbon bonds as unsaturated bonds. Characterization of rubber as having unsaturated carbon chains is well known in the art as shown by ANSI/ASTM Standard D 1419-79A where unsaturated-chain rubbers are referred to as Class R rubbers. Class R rubbers include natural rubber and various synthetic rubbers derived at least partly from diolefins. The following is a non-exclusive list of R Class rubbers which can be employed in the present invention:

ABR—Acrylate-Butadiene
BR—Butadiene
CHR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene
SCR—Styrene-chloroprene
SIR—Styrene-isoprene rubbers The rubbers used herein having carbon-carbon unsaturation also may be other than the Class R rubbers such as EPDM. EPDM rubbers are derived from ethylene-propylenediene monomer and generally about 3–8 percent of their carbon bonds are unsaturated bonds.

The process of the present invention can be practiced with at least one of the foregoing polymers as well as mixtures of polymers intended and selected for properties of the ultimate article prepared from the rubber composition.

The mixtures of elastomers or rubbers included in the compositions of the present invention may be mixtures of synthetic elastomers or mixtures of natural rubber with synthetic elastomers. Of the synthetic elastomers, the IR, BR, SBR, CR, CHR, or the NIR elastomers are the most typically utilized. The two or more elastomers included in the uncured rubber compositions of the invention may be present in varying amounts. For example, the first elastomer may comprise from about 10 parts to about 90 parts of the composition and the second elastomer may comprise from about 90 to about 10 parts by weight of the compositions to total 100 parts by weight of rubber.

When the compositions of the present invention comprise mixtures of natural rubber and synthetic rubbers, the mixture generally will contain from about 60 to about 30 parts by weight of natural rubber and from 40 to about 70 parts by weight of the synthetic rubber or elastomer. Although the mixing of many polymers is within the scope of the invention, rubber compositions will be exemplified herein. Of the synthetic rubbers SBR and polybutadiene are preferred, particularly, oil extended SBR and blends thereof as exemplified hereinbelow.

As noted hereinabove, practice of the present invention is directed toward compounding filler materials with at least one polymer. Typical filler materials include reinforcing fillers normally used in rubber formulations such as carbon blacks, talcs, silica and other finely divided mineral materials. Carbon black and silica are particularly preferred. Silica and other filler materials excluding carbon black are compounded with elastomers in amounts ranging from about 1 to about 80 parts by weight, per 100 parts of rubber (phr).

As will be more fully addressed hereinbelow, the elastomers are compounded with carbon black in amounts ranging from about 5 to about 100 parts by weight, per 100 parts of rubber (phr), with about 5 to about 80 phr being preferred and from about 40 to about 70 phr being more preferred. Mixtures of fillers including carbon black can be employed in the foregoing amounts. The carbon blacks may include any of the commonly available, commercially-produced carbon blacks but those having a surface area (EMSA) of at least 20 m²/g and more preferably at least 35 m²/g up to 200 m²/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

CARBON BLACKS

| ASTM Designation (D-1765-82a) | Surface Area (m²/g) (D-3765) |
|---|---|
| N-110 | 126 |
| N-220 | 111 |
| N-339 | 95 |
| N-330 | 83 |
| N-343 | 90 |
| N-550 | 42 |
| N-660 | 35 |

The carbon blacks utilized in the preparation the filled compositions of the invention may be in pelletized form or an unpelletized flocculent mass.

The filled rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, New York 1982, Vol. 20, pp. 365–468, particularly "Vulcanization Agents and Auxiliary Materials" pp. 390–402. Vulcanizing agents may be used alone or in combination.

Other conventional rubber additives such as fillers, plasticizers, antioxidants, curing agents and the like, may also be used without limitation, in conventional amounts of such additives.

While the present invention is not limited to any particular rubber compounding recipe, exemplary formulations are presented in TABLE II hereinbelow, based upon natural rubber and two oil extended SBR copolymers. For the latter two, total weight was 127 parts by weight comprising 100 parts of SBR rubber and 27 parts of processing oil. The "end-group modified" SBR contains functional groups with strong affinity to the surface of carbon black.

TABLE II

COMPOUNDING RECIPES

| MATERIAL | PARTS |
|---|---|
| ALL NATURAL RUBBER TREAD STOCK: | |
| *MASTERBATCH STAGE:* | |
| Natural Rubber, SIR20 | 100.0 |
| Carbon Black, N110 | 50.0 |
| Antioxidant | 1.0 |
| Wax Blend | 0.5 |
| Zinc Oxide | 3.5 |
| Stearic Acid | 2.0 |
| Subtotal, Masterbatch | 157.0 |
| *FINAL STAGE:* | |
| Sulfur | 1.0 |
| Accelerator | 1.2 |
| Total Parts | 156.2 |
| ALL SYNTHETIC RUBBER TREAD STOCK: | |
| *MASTERBATCH STAGE:* | |
| Oil Extended SBR | 127.0 |
| Carbon Black, N343 | 54.0 |
| Antioxidant | 1.0 |
| Wax Blend | 1.0 |
| Zinc Oxide | 3.0 |
| Stearic Acid | 2.0 |
| Subtotal, Masterbatch | 188.0 |
| *FINAL STAGE:* | |
| Sulfur | 2.0 |
| Accelerator | 1.0 |
| Total Parts | 191.0 |
| TREAD STOCK WITH END GROUP MODIFIED SYNTHETIC RUBBER: | |
| *MASTERBATCH STAGE:* | |
| Oil-Extended, Modified SBR | 86.3 |
| Natural Rubber, SIR20 | 25.0 |
| Carbon Black, N343 | 48.5 |
| Santoflex 13 (Antioxidant) | 1.0 |
| Wax Blend | 1.0 |
| Zinc Oxide | 3.0 |
| Tackifier | 2.0 |
| Naphthenic Oil | 3.8 |
| Stearic Acid | 2.0 |
| Subtotal, Masterbatch | 172.6 |
| *FINAL STAGE:* | |
| Sulfur | 1.5 |
| Accelerators | 1.4 |
| Total Parts | 175.5 |

Unlike existing techniques for rubber compounding wherein filler materials and dry components are mixed into the rubber by addition to a Banbury type mixer or an extruder, the process of the present invention includes an initial step of treating the carbon black with a liquid that will wet the black. Such liquids are selected from the group consisting of non-solvents for the rubber polymer(s) and include for instance, water, and water/surfactant mixtures, with water being preferred.

The liquid is added in amounts of from at least about 10 to about 60 percent by weight based upon the combined weight of the liquid and the filler and such amounts will vary depending upon the liquid and the filler as well as its form e.g., powder, pellets, graphitized (carbon) and the like. For water, the amounts is at least about 10 to about 60 percent by weight with 30 to 50 percent being preferred.

Taking water and carbon black, as the examples provided below demonstrate, the water and black can be combined and then allowed to sit for a period of time of from about one minute to about 12 hours to allow the carbon black to become thoroughly wetted, although larger times are not necessarily precluded. The water and carbon black can also be thoroughly mixed together in appropriate equipment to form a homogeneous mixture for a suitable time such as about one to 10 minutes at a temperature ranging from ambient to about 800° C.

In either instance, after the water has been added to the carbon black, or vice-versa, the rubber polymer and the black/water mixture are combined and mixed whereby the carbon black first becomes distributed and then dispersed within the rubber. Suitable mixing equipment includes any available apparatus employed for rubber compounding, including mixers, kneaders, extruders and the like. Mixing times are generally on the order of from about one to 10 minutes at temperatures of from about 25° to 125° C. Owing to the lubricating effect of the liquid, the filler can be distributed throughout the polymer more readily and hence, mixing energy is reduced.

Normally, during the final mixing step with the rubber, the liquid is driven off by evaporation; however it can also be extracted and collected by any suitable means prior to final mixing so that the liquid originally added to the filler is not present in the rubber composition, at least in any substantial amounts, at the time of vulcanization. While this is certainly true for water, the present invention may also employ liquids that can become incorporated in the final rubber composition.

As is known in the art, it is desirable to obtain a relatively high dispersion index (DI), on the order of 90 to 100. The dispersion index is a measure of the relative roughness of a freshly cut surface of the cured rubber compound which is, in turn, an indication of the average diameter of carbon black agglomerates in the sample. The process of the present invention allows desirable DI values to be obtained with lower expenditures of mixing energy, as will be discussed hereinbelow.

GENERAL EXPERIMENTAL in order to demonstrate the practice and effectiveness of the present invention over the processes and methods of the known art, the following examples were conducted. Examples I–III provide comparisons between dry (conventional) mixing and wet mixing, according to the present invention, involving the three types of rubber compounds presented in Table II. Example IV was conducted with the all-SBR rubber tread compound and further considers lubricated mixing according to the present invention. Examples V–V were conducted with the all-natural rubber tread compounds and further consider lubricated mixing according to the present invention.

EXAMPLE I

This example offers a direct comparison between "wet" and "dry" (conventional) mixing, in a size "B" Banbury mixer. The mixer was operated at 77 RPM, without cooling water, and with ram pressure of 105 psig.

Carbon black and water were premixed outside the Banbury, prior to the start of each test. For each test, the following procedure was used:

| MINUTES | ACTION |
| --- | --- |
| 0 | Charge rubber |
| ½ | Charge ½ of black/water mixture, plus all other pigments |
| 2½ (or 250° F.) | Charge remaining black/water mixture, and sweep |
| 4½ | Sweep |
| 6 (or 340° F.) | Dump batch |

This same procedure was used for all experiments reported in the application, except as specifically noted (e.g., Example IV).

With reference to Table III, it can be seen that for the same mixing time, composition and charge weight (excluding water), per Example I, the energy consumed and the dump temperature were reduced significantly, while the dispersion index was increased markedly. The stock uniformity was also improved via water lubricated mixing, as evidenced by the reduction in the "range" of dispersion index and phr carbon black values obtained for multiple samples of each stock. The Mooney viscosity of the stock prepared via water lubrication was also higher than that made via conventional ("dry") mixing which was presumed due to the reduced energy input for the "wet" mix.

TABLE III

EFFECT OF WATER LUBRICATION ON BANBURY MIXING OF ALL-NATURAL RUBBER TREAD COMPOUND:

| | | |
| --- | --- | --- |
| Fill Factor (%) | 75 | 75 |
| Total Mix Time (Minutes) | 5.8 | 5.8 |
| Water/Black Ratio | 0 | 1.0:1 |
| Dump Temp -°F. | 340 | 233 |
| Total KWH/LB | 0.1614 | 0.1374 |
| Dispersion Index: | | |
| Average | 76.5 | 98.2 |
| Range (N = 4) | 14.2 | 0.5 |
| phr Carbon Black (via TGA): | | |
| Average | 48.2 | 48.6 |
| Range (N = 2) | 0.5 | 0.2 |
| Final % Water (Karl Fischer; N = 2) | 0 | 5.95 |
| ML4/130° C. (after drying) | 74.3 | 110.7 |

EXAMPLE II

These two tests were made in the "B" sized Banbury, at conditions comparable to those for the "All-Natural Rubber" (NR) tread stock of the previous example. In these tests, the two stocks comprising the "All Synthetic Rubber" tread stock of Table II were mixed to the same total energy input level, rather than for the same total mix time. From the data reported in Table IV, it can be seen that:

The time required to reach the selected energy level was about the same for the two stocks (the rate of energy consumption was about the same which is typical of results we have observed for this recipe, contrary to our experience for the all-natural rubber (NR) recipe).

The carbon black dispersion was again markedly better with water lubricated mixing.

The dump temperature was significantly reduced by water lubrication.

Stock uniformity was about the same for both cases.

The Mooney viscosity for the stock mixed with water-lubrication was higher than for the "conventional" case (contrary to the result for "all-NR").

TABLE IV

EFFECT OF WATER LUBRICATION ON BANBURY MIXING OF ALL-SYNTHETIC RUBBER TREAD COMPOUND:

| | | |
|---|---|---|
| Fill Factor (%) | 85 | 85 |
| Total Mix Time (Minutes) | 5.3 | 5 |
| Water/Black Ratio | 0 | 1.0:1 |
| Dump Temp - °F. | 340 | 249 |
| Total KWH/LB | 0.1172 | 0.1172 |
| Dispersion Index: | | |
| Average | 82.0 | 91.1 |
| Range (N = 4) | 2.7 | 2.9 |
| phr Carbon Black (via TGA): | | |
| Average | 49.0 | 47.6 |
| Range (N = 4) | 1.2 | 2.8 |
| Final % Water (Karl Fischer; N = 2) | 0 | 3.30 |
| ML4/130° C. (after drying) | 91.1 | 82.7 |

EXAMPLE III

For these tests, two stocks comprising the "End Group Modified Synthetic Rubber" tread stock of Table II were employed. Again, mixing was performed in a "B" Banbury, at conditions comparable to those for the previous two examples (all-NR and all-SBR recipes). For these, total mix time was constant. The data reported in Table V shows that, with water lubrication:

The dump temperature was reduced.

The energy requirement was reduced.

The carbon black dispersion was very significantly increased.

Stock uniformity was about the same as for "conventional" mixing.

The Mooney viscosity was about the same as for "conventional" mixing.

TABLE V

EFFECT OF WATER LUBRICATION ON BANBURY MIXING OF MODIFIED SYNTHETIC RUBBER TREAD COMPOUND:

| | | |
|---|---|---|
| Fill Factor (%) | 77 | 77 |
| Total Mix Time (Minutes) | 4 | 4 |
| Water/Black Ratio | 0 | 1.0:1 |
| Dump Temp - °F. | 290 | 221 |
| Total KWH/LB | 0.0866 | 0.0733 |
| Dispersion Index: | | |
| Average | 69.4 | 85.3 |
| Range (N = 4) | 3.7 | 4.5 |
| phr Carbon Black (via TGA): | | |
| Average | 44.96 | 43.36 |
| Range (N = 2) | 0.3 | 0.3 |
| Final % Water (Gravimetric; N = 4) | 0 | 7.18 |
| ML4/100° C. (After Drying) | 85.7 | 84.7 |

Example IV

CHANGES IN TORQUE, TEMPERATURE, DISPERSION AND MOISTURE LEVEL DURING LUBRICATED MIXING

For this test, only the oil-extended SBR, and N343 carbon black shown in the "All-SBR, Tread Recipe" were mixed, with water lubrication, in a Brabender Plasticorder. The total charge weight (excluding water) was 55 grams. The mixer cavity was preheated to 100° C. Materials were charged to the mixer in the following order with cam rotors turning at 60 RPM: (1) Carbon black, (2) water equal to 50% of the dry weight of the carbon black (3) SBR. At two minute intervals, the mixer was stopped, and small samples were removed for analysis. The resulting dispersion index and moisture content for each sample are shown in FIG. 1.

When water and carbon black are mixed in the absence of rubber, the water is absorbed into the pore structure of the carbon black. At this point, the carbon black appears to be only slightly dampened, despite the large quantity of water present. As the rubber is forced into the voids of the carbon black, the water is displaced. A portion of this water forms a lubricating film between the walls of the mixer cavity and the materials being mixed. As this occurs, the mixer torque drops rapidly, as shown by the graph. A portion of this water is also retained within the material. As mixing proceeds, the water is gradually evaporated. As this takes place, the lubricating film is also removed, so that the torque begins to rise. At the same time, the stock temperature also rises, as more energy is absorbed by the mass, and as the cooling effect of the evaporation of water is reduced.

With reference to the graph presented in FIG. 1, it is interesting to note that although the rate of energy input to the mass during the period from about one to about six minutes was quite low (evidenced by low torque), the dispersion index of the stock continued to rise. Apparently, the kneading and distortion of the material effectively promoted dispersion, even in the absence of shear at the mixer walls. This result is unexpected, and indicates that an effective mechanism for dispersion is operating which is contrary to that which is normally associated with carbon black dispersion.

Example V

In this example, the "All Natural Rubber" compound of Table II was employed and only the masterbatch stage was mixed. Two mixtures were prepared without any ram pressure, one with water and one without. Two additional mixtures were prepared with ram pressure, one with water and one without. Ram pressure equal to 10 psi (68.9 Pa) was applied in the latter sequence to keep the rubber compound ingredients in contact with the mixer rotors. The various conditions and observations have been reported in Table VI which should be reviewed in conjunction with this Example.

These mixes were performed in a Brabender "Prep Center" mixer, with "Banbury"—type rotors. The mixer was electrically heated to 60° C., and the rotor speed was 60 RPM. Total batch weight (excluding water) was 280.0 grams.

The dad presented in Table VI shows that, when mixing was done with no ram pressure applied to the material in the cavity, the ability of the mixer to transmit power to the material when water was present was limited (see very low energy inputs, caused by unproductive "slippage" in the mixing cavity). This resulted in a low dispersion index, compared to a mix made without water lubrication, for the same total mixing time. The energy required to reach a given level of dispersion was, however, lower when water was present.

However, when ram pressure was applied to the material during mixing, both the time and energy required to reach a given level of dispersion were reduced by water lubrication. Further, the level of dispersion reached via water lubrication with ram pressure was higher than could be reached without lubrication, even at quite high energy input levels (see "RAH PRESSURE APPLIED; NO WATER" case).

In all tests with water lubrication, the stock temperature was much lower throughout the mixing cycle than for mixes without water present.

tical. However, when water was premixed with the carbon black (prior to charging to the mixer), the energy required to reach a given level of dispersion was significantly reduced. For example, when water and black were premixed, the

TABLE VI

| | EFFECT OF RAM PRESSURE | | | | | | | | | | |
|---|---|---|---|---|---|---|---|---|---|---|---|
| | NO RAM PRESSURE | | | | | | RAM PRESSURE APPLIED | | | | |
| | NO WATER | | | 1.0:1 WATER/N110 | | | NO WATER | | | 1.0:1 WATER/N110 | |
| Mix Time (Minutes) | 0 | 4 | 6 | 0 | 4 | 6 | 0 | 4 | 6 | 0 | 4 | 5 |
| Energy - KWH/LB | 0 | .114 | .174 | 0 | .036 | .049 | 0 | .258 | .329 | 0 | .167 | .205 |
| Dispersion Index | 0 | 92.7 | 93.5 | 0 | 82.2 | 85.9 | 0 | 92.1 | 92.1 | 0 | 93.4 | 95.5 |
| Stock Temperature - °C. | — | 140 | 144 | 85 | 95 | 95 | 86 | 164 | 168 | 84 | 94 | 94 |
| Weight % Water | 0 | 0 | 0 | 31.8 | 9.1 | 8.1 | 0 | 0 | 0 | 31.8 | 10.6 | 9.6 |

Example VI

In this example, the "All-Natural Rubber" compound was employed and only the masterbatch stage was mixed. Three mixtures were prepared without any water, with water premixed with the carbon black and with water added 40 seconds after mixing commenced. The various conditions and observations have been reported in Table VII which should be reviewed in conjunction with this Example.

These mixes were performed in a Brabender "Prep Center" mixer, with "Banbury"—type rotors. The mixer was electrically heated to 60° C., and the rotor speed was 60 RPM. Ram pressure was applied to the material during mixing, in all cases. Total batch weight (excluding water) was 280.0 grams. Data was collected as in Table VI and has been reported in Table VII.

For the third data set ("WATER ADDED AT 40 SECONDS"), the increase of temperature with mixing time was very similar to that of the first data set ("NO WATER ADDED"). Also, the water content of the stock decreased rapidly, to a level comparable to that of the first data set.

energy required to reach 90% dispersion was about 58% of that required for either of the other two tests.

Example VII

It is known that water contents of rubber compounds in excess of about one percent can result in poor physical properties of cured stocks. It is therefore essential that a practical means of water removal from stocks mixed via the water lubrication technique be available. Water removal must be completed prior to processing and curing, so that problems related to porosity of extrudates, etc. will be avoided, and to prevent interference with the curing reaction.

This series of all-natural rubber tread stocks was mixed in a size "B" Banbury. Two sets of mixes were performed, at 0.5:1 and at 1:1 water to carbon black. Three different mixing periods were provided for each set. These data refer only to the masterbatch mixing stage. Water was removed after the masterbatch mixing stage. The various conditions and observations have been reported in Table VIII which should be reviewed in conjunction with this Example.

TABLE VII

| | EFFECT OF DELAYED WATER ADDITION | | | | | | | | | | | |
|---|---|---|---|---|---|---|---|---|---|---|---|---|
| | NO WATER ADDED | | | | 1.0:1 WATER, PREMIXED WITH CARBON BLACK | | | | 1.0:1 WATER, ADDED AT 40 SECONDS | | | |
| Mix Time (Minutes) | 0 | 2 | 4 | 6 | 0 | 2 | 4 | 6 | 0 | 2 | 4 | 6 |
| Energy - KWH/LB | 0 | .179 | .258 | .329 | 0 | .121 | .158 | .185 | 0 | .209 | .301 | .395 |
| Dispersion Index | 0 | 75.6 | 92.1 | 92.1 | 0 | 84.3 | 85.2 | 92.5 | 0 | 80.8 | 89.3 | 94.4 |
| Stock Temperature - °C. | 86 | 156 | 164 | 168 | 71 | 95 | 94 | 94 | 86 | 129 | 147 | 163 |
| Weight % Water | 0 | 0 | 0 | 0 | 31.8 | 13.0 | 10.9 | 10.2 | 31.8 | 2.3 | 0.7 | 0.3 |

As shown by the graph in FIG. 2, the energy dispersion relationships for the case with no water added, and with water addition delayed for 40 seconds are essentially iden-

TABLE VIII

EFFECT OF MIXING CONDITIONS ON FINAL STOCK WATER CONTENT
(ALL-NATURAL RUBBER TREAD STOCK)

| | Stock Number | | | | | |
|---|---|---|---|---|---|---|
| | 1 | 2 | 3 | 4 | 5 | 6 |
| Fill Factor (%) | 84.8 | 84.8 | 84.8 | 84.8 | 84.8 | 84.8 |
| Total Mix Time (Minutes) | 4.8 | 8.0 | 10.0 | 6.0 | 8.0 | 7.5 |
| Water/Black Ratio | 1.0:1 | 1.0:1 | 1.0:1 | 0.5:1 | 0.5:1 | 0.5:1 |
| Initial Temp - °F. (*) | 217 | 176 | 195 | 180 | 187 | 180 |
| Dump Temp - °F. | 240 | 268 | 311 | 262 | 335 | 340 |
| Total KWH/LB | 0.1177 | 0.1935 | 0.2558 | 0.1669 | 0.2361 | 0.2135 |
| Dispersion Index: | | | | | | |
| Average | 86.0 | 89.3 | 94.8 | 76.2 | 82.9 | 78.1 |
| Range (N = 6) | 10.2 | 8.6 | 7.8 | 13.1 | 15.3 | 9.5 |
| phr Carbon Black (via TGA): | | | | | | |
| Average | 45.8 | 46.6 | 46.4 | 46.1 | 46.0 | 45.3 |
| Range | 0.6 | 0.6 | 0.5 | 0.3 | 0.7 | 0.5 |
| % Water (Karl Fischer; N = 2) | 8.71 | 4.44 | 0.98 | 2.65 | 0.34 | 0.28 |
| ML4/130° C. | 105.8 | 99.4 | 110.2 | 116.3 | 108.9 | 109.1 |

(*) - Measured after rubber charging, and just prior to first increment of carbon black + water premixed material.

For the 1:1 ratio, the water content of the stock was clearly related to the "dump temperature", which is a function of the initial mixer temperature, the mixing time and the total energy input level. For the 10 minute mix, the residual moisture content was within the 1% limit. Similar results are seen for the 0.5:1 ratio, except that the residual moisture content was much lower, for a given combination of initial temperature, mixing time and energy input.

Thus, it is possible to effect adequate water removal during the masterbatch mixing cycle, by proper selection of mixing parameters. However, other means of water removal (such as the use of vented extruders, heated two-roll mills, etc.) can be substituted, as will be apparent to those skilled in the art.

Example VIII

Finally, in order to demonstrate that good physical properties are obtained for cured rubber compounds having been mixed with water lubrication, according to the present invention the following work was conducted. For this example, samples of each of the mixtures prepared in Examples I, II and III were further mixed on a two-roll mill to incorporate curatives (see "Final Stage" of each of the three recipes in Table II). Prior to this "Final" mixing, those samples which contained greater than one percent water were vacuum dried, to reduce the water to that level. These stocks were then cured, and physical properties were measured. Table IX presents the results of those tests. As the data reveals, mixing in the presence of water has little or no effect on the physical properties, for each of the three recipes studied, provided that the water is removed prior to "Final" mixing and curing.

TABLE IX

PHYSICAL PROPERTIES FOR CURED RUBBER COMPOUNDS MIXED WITH WATER LUBRICATION

| | Physical Properties | | | | | |
|---|---|---|---|---|---|---|
| | All Natural Rubber | | All Synthetic Rubber | | Modified Synthetic Rubber | |
| | Stock Number | | | | | |
| | 7 | 8 | 9 | 10 | 11 | 12 |
| | Mooney Viscosity | | | | | |
| | (Dry) | (Wet) | (Dry) | (Wet) | (Dry) | (Wet) |
| ML1 + 4/100° C. | 64.7 | 70.5 | 72.1 | 68.1 | 73.6 | 75.9 |
| Monsanto Rheometer | | | | | | |
| ML | 8.50 | 8.98 | 6.62 | 6.09 | 6.70 | 7.84 |
| TS2 | 7:55 | 6:27 | 6:37 | 6:05 | 4:19 | 4:18 |
| TC90 | 13:36 | 11:17 | 12:20 | 11:29 | 5:52 | 5:45 |
| MH | 34.70 | 35.12 | 25.95 | 26.05 | 31.98 | 31.48 |
| Ring Tensile @ 23° C. | | | | | | |
| 50% Modulus (PSI) | 169.39 | 156.12 | 153.91 | 160.04 | 178.26 | 169.34 |
| 100% Modulus (PSI) | 307.16 | 271.96 | 271.39 | 283.79 | 327.35 | 310.84 |
| 200% Modulus (PSI) | 762.33 | 676.76 | 657.34 | 692.88 | 813.98 | 770.64 |
| 300% Modulus (PSI) | 1418.62 | 1289.99 | 1273.21 | 1312.92 | 1568.43 | 1452.65 |
| Max, Stress (PSI) | 1547.31 | 1502.03 | 2629.08 | 3001.18 | 3026.91 | 3192.54 |
| Max % Strain | 319.8 | 334.4 | 502.9 | 536.4 | 468.1 | 513.3 |
| Ring Tensile @ 100° C. | | | | | | |
| 50% Modulus (PSI) | 109.81 | 110.46 | 134.83 | 135.07 | 144.04 | 128.51 |
| 100% Modulus (PSI) | 168.20 | 169.53 | 233.38 | 236.43 | 247.72 | 221.52 |
| 200% Modulus (PSI) | 320.74 | 325.22 | 586.64 | 588.20 | 670.08 | 560.59 |
| 300% Modulus (PSI) | 568.78 | 583.76 | 1133.49 | 1141.40 | 1282.88 | 1070.62 |
| Max, Stress (PSI) | 1889.38 | 2063.08 | 1327.16 | 1564.64 | 1498.07 | 1460.46 |
| Max % Strain | 656.1 | 676.2 | 333.8 | 372.9 | 334.4 | 375.9 |
| Ring Tear @ 100° C. | | | | | | |
| Tear Strength (PSI) | 623.10 | 607.40 | 255.60 | 260.30 | 252.10 | 237.20 |
| Travel @ Tear (%) | 711.30 | 742.51 | 359.20 | 369.60 | 322.90 | 326.80 |
| Energy to Break (In-Lbs/In$^2$) | 1753.0 | 1787.0 | 374.4 | 389.4 | 343.8 | 328.5 |

Thus it should be evident that the process of the present invention is highly effective in the distribution and dispersion of filler materials in polymers with less consumption of mixing energy than conventional mixing techniques where liquids have not been employed. It should also be understood that the unexpected results are not attributable to any particular type of mixing equipment.

Based upon the foregoing disclosure, it should now be apparent that practice of the process described herein will carry out the objects set forth hereinabove. It is, therefore, to be understood that any variations evident fall within the scope of the claimed invention and thus, the selection of specific processing equipment can be determined without departing from the spirit of the invention herein disclosed and described. Moreover, practice according to the present invention is not necessarily limited to the compositions disclosed herein, the examples having been provided merely to illustrate operation of the invention. Thus, the scope of the invention shall include all modifications and variations that may fall within the scope of the attached claims.

What is claimed is:

1. A process for compounding filler materials and solid rubber polymers for the preparation of vulcanizable rubber compositions comprising the steps of:

combining at least one solid rubber polymer, having a high molecular weight, and other compounding ingredients with at least one filler treated with a liquid in an amount of from about 10 to 60 percent by weight, based upon the combined weight of the liquid and the filler under conditions sufficient to uniformly distribute the filler to form a pre-blend; and mixing said pre-blend until the filler is suitably dispersed throughout said rubber polymer, pre-blend with attendant release of said liquid from said preblend.

2. A process, as set forth in claim 1, wherein said step of treating includes the step of agitating said filler and said liquid together.

3. A process, as set forth in claim 1, wherein said step of treating includes the steps of contacting said filler in said liquid for a period of at least about one minute.

4. A process, as set forth in claim 1, wherein said liquid is selected from the group consisting of water and other non-solvents for said rubber polymers.

5. A process, as set forth in claim 4, wherein said liquid is water.

6. A process, as set forth in claim 1, wherein said step of adding includes the use of from about 5 to about 100 parts by weight of filler on a dry basis per 100 parts by weight of said rubber polymer.

7. A process, as set forth in claim 6, wherein said step of adding includes mixing sufficient to provide a dispersion index of said filler in said rubber polymer of from about 90 to 100.

8. A process, as set forth in claim 7, wherein said step of mixing said pre-blend includes mixing sufficient to provide a final dispersion index of said filler in said rubber polymer of from about 90 to 100.

9. A process, as set forth in claim 8, wherein said step of mixing consumes less energy than is required to disperse said filler within said rubber polymer in the absence of said step of treating.

10. A process, as set forth in claim 1, wherein said rubber polymers are selected from the group consisting of natural rubber, synthetic rubbers and mixtures thereof.

11. A process, as set forth in claim 10, wherein said synthetic rubbers are selected from the group consisting of homopolymers of diolefins and copolymers thereof with monovinyl aromatic monomers and trienes.

12. A process, as set forth in claim 11, wherein said diolefin homopolymers are prepared from monomers selected from the group consisting of diolefins having from about 4 to 12 carbon atoms and said monovinyl aromatic monomers have from 8 to about 20 carbon atoms.

13. A process, as set forth in claim 12, wherein said monomers are butadiene and styrene.

14. A process, as set forth in claim 10, including the step of adding at least a rubber second polymer to said one rubber polymer wherein said rubber polymers are selected from the group consisting of R Class Rubbers, as defined by ASTMD 1419-79A and ethylene-propylene-diene terpolymers.

15. A vulcanizable rubber composition containing filler prepared by:

combining at least one solid rubber polymer, having a high molecular weight, and other compounding ingredients with at least one filler treated with a liquid in an amount of from about 10 to 60 percent by weight, based upon the combined weight of the liquid and the filler under conditions sufficient to uniformly distribute the filler to form a pre-blend; and mixing the pre-blend until the filler is suitably dispersed throughout said rubber polymer, with attendant release of said liquid from said pre-blend.

16. A vulcanizable rubber composition, as set forth in claim 15, wherein said liquid is selected from the group consisting of water and other non-solvents for said rubber polymers.

17. A vulcanizable rubber composition, as set forth in claim 16, wherein said liquid is water.

18. A vulcanizable rubber composition, as set forth in claim 15, wherein said rubber polymers are selected from the group consisting of natural rubber, synthetic rubbers and mixtures thereof.

19. A vulcanizable rubber composition, as set forth in claim 18, wherein said synthetic rubbers are selected from the group consisting of homopolymers of diolefins and copolymers thereof with monovinyl aromatic monomers and trienes.

20. A vulcanizable rubber composition, as set forth in claim 19, wherein said diolefin homopolymers are prepared from monomers selected from the group consisting of diolefins having from about 4 to 12 carbon atoms and said monovinyl aromatic monomers have from 8 to about 20 carbon atoms.

21. A vulcanizable rubber composition, as set forth in claim 20, wherein said monomers are butadiene and styrene.

* * * * *